United States Patent
Fuwa et al.

(10) Patent No.: US 8,155,828 B2
(45) Date of Patent: Apr. 10, 2012

(54) CONTROL METHOD OF TRAVELING DOLLY

(75) Inventors: Toshio Fuwa, Nisshin (JP); Issei Nakashima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1137 days.

(21) Appl. No.: 11/994,379

(22) PCT Filed: Jun. 27, 2006

(86) PCT No.: PCT/JP2006/313201
§ 371 (c)(1),
(2), (4) Date: Dec. 31, 2007

(87) PCT Pub. No.: WO2007/001083
PCT Pub. Date: Jan. 4, 2007

(65) Prior Publication Data
US 2009/0030597 A1    Jan. 29, 2009

(30) Foreign Application Priority Data
Jun. 29, 2005   (JP) .................................. 2005-190781

(51) Int. Cl.
*G06F 17/00* (2006.01)
(52) U.S. Cl. ............. 701/36; 180/7.1; 180/21; 180/218; 180/282
(58) Field of Classification Search .................. None
See application file for complete search history.

(56) References Cited

U.S. PATENT DOCUMENTS

| | | |
|---|---|---|
| 5,791,425 A | 8/1998 | Kamen et al. |
| 6,302,230 B1 | 10/2001 | Kamen et al. |
| 7,417,388 B2 * | 8/2008 | Fuwa ............................ 318/139 |
| 7,424,927 B2 * | 9/2008 | Hiramatsu ..................... 180/282 |
| 7,640,086 B2 * | 12/2009 | Nakashima et al. ............. 701/36 |

(Continued)

FOREIGN PATENT DOCUMENTS

CN    1502513 A    6/2004

(Continued)

OTHER PUBLICATIONS

Ding, X., et al. "Motion Control of Two-wheel Mobile Inverted Pendulum Based on SIRMs," *J. Syst. Simulation*, vol. 16, No. 11, Nov. 2004.

(Continued)

*Primary Examiner* — Thomas Black
*Assistant Examiner* — Lin B Olsen
(74) *Attorney, Agent, or Firm* — Finnegan, Henderson, Farabow, Garrett & Dunner, LLP (57) ABSTRACT

A control method is proposed for a traveling dolly. The traveling dolly may include wheels driven by motors and a body supported by the wheels. The traveling dolly may further include a control computer commanding control command value to the motors, and a centroid of the body positioning above a rotation axis of the wheels. The control method may include the control computer estimating external force moment, which is a moment of inertia around the rotation axis of the wheels generated by external force applied on the body; a tilt angle of the body, which makes a gravity moment around the rotation axis of the centroid of the body balance with the external force moment, being set as a target body tilt angle; and based on the target body tilt angle, calculating a torque command value for the motors.

8 Claims, 3 Drawing Sheets

U.S. PATENT DOCUMENTS

| | | | |
|---|---|---|---|
| 7,779,939 B2 * | 8/2010 | Kamen et al. | 180/7.1 |
| 7,823,676 B2 * | 11/2010 | Yamada et al. | 180/218 |
| 2004/0011573 A1 * | 1/2004 | Kamen et al. | 180/7.1 |
| 2008/0173493 A1 * | 7/2008 | Adachi | 180/218 |

FOREIGN PATENT DOCUMENTS

| | | |
|---|---|---|
| EP | 1632428 A1 | 3/2006 |
| JP | 63-305082 * | 12/1988 |
| JP | 4-15713 | 1/1992 |
| JP | 2530652 | 6/1996 |
| JP | 3070015 | 5/2000 |
| JP | 2002-104223 | 4/2002 |
| JP | 2003-271243 | 9/2003 |
| JP | 2004-276727 | 10/2004 |
| JP | 2004-295430 | 10/2004 |
| JP | 2005-001554 | 1/2005 |
| JP | 2005-160152 | 6/2005 |
| WO | WO 2004/110854 | 12/2004 |
| WO | WO 2004110854 A1 * | 12/2004 |

OTHER PUBLICATIONS

Extended European Search Report in European Application No. 06 76 7778 dated Oct. 27, 2011.

* cited by examiner

CONTROL METHOD OF TRAVELING DOLLY

FIELD OF THE ART OF THE INVENTION

The present invention relates to control method of an inverted pendulum-type traveling dolly that a centroid of the body positions above a rotation axis of a wheel. The present invention also relates to the traveling dolly.

BACKGROUND ART

With regard to an inverted pendulum-type traveling dolly and control method thereof, for example, there is known an art described in the Japanese Patent Laid Open Gazette 2004-295430.

In the Japanese Patent Laid Open Gazette 2004-295430, a traveling dolly is disclosed which has a wheel and a body supported by the wheel, a centroid of the body positioning above a rotation axis of the wheel. With regard to the traveling dolly, control at the dolly translation direction (the direction rectangular to the axis) including the inverted pendulum control and the position control and control at the dolly rotation direction (the turning direction of the axis) including only the position control are performed.

The traveling dolly has a control means calculating control command value to a drive means for the wheel (torque command value to a motor). The control means is so robust as to make the body stand invertedly stably against disturbance. Accordingly, even if the dolly located surface slopes or load is changed, the body can keep on standing stably.

With regard to the control at the dolly translation direction, wheel angle (rotation angle of the wheel relative to the body), wheel angular velocity which is a single derivative of the wheel angle, body tilt angle (tilt from the vertical direction) and body tilt angular velocity which is a single derivative of the body tilt angle are used as state quantities (observed quantities). Hereupon, the body tilt angle is instable so that the dolly cannot stand invertedly stably without feedback control. Accordingly, with regard to the control at the dolly translation direction, the control input is determined so as to make all the state quantities zero.

However, the control at the dolly translation direction disclosed in the Japanese Patent Laid Open Gazette 2004-295430 has one input (axle torque) and two outputs (wheel angle and body tilt angle) and uses the wheel angle and the body tilt angle so as to calculate the torque command value to the motor. Accordingly, trade-off (the relation that if one of conditions is satisfied, the other condition becomes dissatisfied) exists between the two outputs, and if the disturbance applied on the dolly is large, below problems may be caused.

Namely, since the control at the dolly translation direction has one input and two outputs as mentioned above, when the external force is applied on the body by the movement of the centroid caused by the change of position of an operator on the body, the fluctuation of centroid position caused by mounting a burden on the body, the operator riding on and off or the like, firstly, the axle torque is applied so as to make the body tilt angle fluctuated by the external force return to zero. The body tilt angle is stabilized accordingly and then the axle torque is applied so as to make the wheel angle zero, thereby returning the moved dolly to the initial position.

When the disturbance is small, the dolly slightly moves and stops at the initial position by the above-mentioned control. However, for example when the external force caused by the large disturbance which is stationary or changes transiently widely is applied on the body, the body tilt angle and the wheel angle cannot be made zero simultaneously, whereby the oscillation centering on the initial position (the position of the dolly before applying the disturbance thereon) is difficult to be converged. Accordingly, the position of the wheel is moved widely (the wheel angle is changed widely). Furthermore, according to the same reason, if an operator jumps on the traveling dolly or similar operation is performed on the dolly, the position of the wheel must be moved widely and an operator cannot get on and off easily.

Namely, in the dolly translation direction, if a heavy thing is mounted on a position difference from the centroid position of the body or an operator rides on the body and lifts a heavy thing by a suspension mechanism such as an arm provided on the upper portion of the dolly, the centroid position of the body is changed, whereby the dolly cannot stop at the initial position.

Considering such a traveling dolly as a mobile body on which an operator rides or which carries goods, the occurrence of large movement of the wheel position by the disturbance makes an operator difficult to get on and off and makes goods difficult to be taken on and off.

Accordingly, the purpose of the present invention is to provide control method of a traveling dolly and the traveling dolly which makes the movement of the dolly (a position of a wheel) minimum and enables stable position control in the case that large external force is applied on the dolly so that goods can be taken on and off easily and an operator can get on and off easily.

SUMMARY OF THE INVENTION

According to the present invention, control method of a traveling dolly having a wheel driven by a drive means, a body supported by the wheel, and a control means commanding control command value to the drive means, a centroid of the body positioning above a rotation axis of the wheel, is characterized in that:

the control means estimates external force moment, which is moment of inertia around the rotation axis generated by external force applied on the body;

based on the estimated external force moment, tilt angle of the body, which makes gravity moment around the rotation axis of the body centroid balances with the external force moment, is set as target body tilt angle; and based on the target body tilt angle, the control command value is calculated.

Accordingly, by calculating the control command value based on the target body tilt angle, dummy body tilt angle becomes zero so that the dolly can stops at the initial position even if the external force is applied. Namely, even if large external force is applied on the body, the dolly (the position of the wheel) is not moved and the position can be controlled stably at the place, whereby an operator can get on and off easily and goods can be taken on and off easily.

With regard to the control method of the traveling dolly according to the present invention, the external force moment is found from disturbance observer. Namely, by using the disturbance observer estimated from the disturbance as state quantity, the external force moment generated by the external force applied on the body by the disturbance is estimated as state quantity so as to offset the estimated disturbance included in the parameter fluctuation controllingly.

Accordingly, the external force moment can be found with an existing sensor or the like without providing a sensor newly so as to detect the state quantity.

According to the present invention, control method of a traveling dolly having a wheel driven by a drive means, a body supported by the wheel, and a control means commanding control command value to the drive means, a centroid of the body positioning above a rotation axis of the wheel, is characterized in that:

the traveling dolly comprises a first detection means detecting at least one of tilt angle and tilt angular velocity of the body and a second detection means detecting at least one of rotation angle and angular velocity of the wheel; and in the case that the control means does not transmit control command value for moving the body and the tilt angle or the tilt angular velocity of the body detected by the first detection means becomes a value other than zero, target tilt angle of the body is increased or decreased until the tilt angle or the tilt angular velocity becomes zero, and the control command value is calculated based on the target tilt angle.

Accordingly, the moving distance from the time that the external force applied on the body by the disturbance to the time that the traveling dolly is stopped stably is shorten. Accordingly, for example in the two-wheel state of the traveling, goods can be taken on and off easily and an operator can get on and off easily.

With regard to the control method of the traveling dolly according to the present invention, the target tilt angle is increased or decreased corresponding to the absolute value of the tilt angle or the tilt angular velocity of the body detected by the first detection means.

Accordingly, the slight vibration can be prevented in the region that the absolute value of the body tilt angle or the body tilt angular velocity is small, that is, in the vicinity of the balanced position of the body.

Furthermore, with regard to the control method of the traveling dolly according to the present invention, the increase and decrease value of the target tilt angle is learned so as to decrease the fluctuation of the tilt angle and the tilt angular velocity based on at least one of the tilt angle and the tilt angular velocity as the performance indexes.

Accordingly, the slight vibration in the vicinity of the balanced position of the body is prevented efficiently.

According to the present invention, control method of a traveling dolly having a wheel driven by a drive means, a body supported by the wheel, and a control means commanding control command value to the drive means, a centroid of the body positioning above a rotation axis of the wheel, is characterized in that:

the traveling dolly comprises a first detection means detecting at least one of tilt angle and tilt angular velocity of the body and a second detection means detecting at least one of rotation angle and angular velocity of the wheel; and in the case that the control means does not transmit control command value for moving the body and the angular velocity of the wheel detected by the second detection means becomes a value other than zero, target tilt angle of the body is increased or decreased until the angular velocity becomes zero, and the control command value is calculated based on the target tilt angle.

Accordingly, the moving distance from the time that the external force applied on the body by the disturbance to the time that the traveling dolly is stopped stably is shorten. Accordingly, for example in the two-wheel state of the traveling, goods can be taken on and off easily and an operator can get on and off easily.

With regard to the control method of the traveling dolly according to the present invention, the target tilt angle is increased or decreased corresponding to the absolute value of the angular velocity of the wheel detected by the second detection means.

Accordingly, the slight vibration can be prevented in the region that the absolute value of the angular velocity of the wheel is small, that is, in the vicinity of the balanced position of the body.

Furthermore, with regard to the control method of the traveling dolly according to the present invention, the increase and decrease value of the target tilt angle is learned so as to decrease the fluctuation of the rotation angle and the angular velocity of the wheel based on at least one of the rotation angle and the angular velocity of the wheel as the performance indexes.

Accordingly, the slight vibration in the vicinity of the balanced position of the body is prevented efficiently.

According to the present invention, a traveling dolly having a wheel driven by a drive means, a body supported by the wheel, and a control means commanding control command value to the drive means, a centroid of the body positioning above a rotation axis of the wheel, is characterized in that:

the control means estimates external force moment, which is moment of inertia around the rotation axis generated by external force applied on the body;

based on the estimated external force moment, tilt angle of the body, which makes gravity moment around the rotation axis of the body centroid balances with the external force moment, is set as target body tilt angle; and based on the target body tilt angle, the control command value is calculated.

Accordingly, by calculating the control command value based on the target body tilt angle, dummy body tilt angle becomes zero so that the dolly can stops at the initial position even if the external force is applied. Namely, even if large external force is applied on the body, the dolly (the position of the wheel) is not moved and the position can be controlled stably at the place, whereby an operator can get on and off easily and goods can be taken on and off easily.

According to the present invention, a traveling dolly having a wheel driven by a drive means, a body supported by the wheel, and a control means commanding control command value to the drive means, a centroid of the body positioning above a rotation axis of the wheel, is characterized in that:

the traveling dolly comprises a first detection means detecting at least one of tilt angle and tilt angular velocity of the body and a second detection means detecting at least one of rotation angle and angular velocity of the wheel; and in the case that the control means does not transmit control command value for moving the body and the tilt angle or the tilt angular velocity of the body detected by the first detection means becomes a value other than zero, target tilt angle of the body is increased or decreased until the tilt angle or the tilt angular velocity becomes zero, and the control command value is calculated based on the target tilt angle.

Accordingly, the moving distance from the time that the external force applied on the body by the disturbance to the time that the traveling dolly is stopped stably is shorten. Accordingly, for example in the two-wheel state of the traveling, goods can be taken on and off easily and an operator can get on and off easily.

According to the present invention, a traveling dolly having a wheel driven by a drive means, a body supported by the wheel, and a control means commanding control command value to the drive means, a centroid of the body positioning above a rotation axis of the wheel, is characterized in that:

the traveling dolly comprises a first detection means detecting at least one of tilt angle and tilt angular velocity of the body and a second detection means detecting at least one of rotation angle and angular velocity of the wheel; and in the case that the control means does not transmit control command value for moving the body, the angular velocity of the wheel detected by the second detection means becomes a value other than zero, target tilt angle of the body is increased or decreased until the angular velocity becomes zero, and the control command value is calculated based on the target tilt angle.

Accordingly, the moving distance from the time that the external force applied on the body by the disturbance to the time that the traveling dolly is stopped stably is shorten. Accordingly, for example in the two-wheel state of the traveling, goods can be taken on and off easily and an operator can get on and off easily.

THE BEST MODE OF EMBODIMENT OF THE INVENTION

Firstly, explanation will be given on schematic construction of an example of a traveling dolly according to the present invention by reference to FIG. 1.

The traveling dolly according to the present invention has left and right wheels 2 and 3 disposed in a lower portion of a main body of the dolly (hereinafter, referred to as "body") 1 formed by framing to substantial rectangular hexahedral shape. The wheels 2 and 3 are arranged on the same rotation axis bilaterally symmetrically, and the body 1 can be tilted to the direction perpendicular to the rotation axis.

A motor 4 as a driving means is connected to the right wheel 2, and a motor 5 as a driving means is connected to the left wheel 3. Encoders 4a and 5a (see FIG. 2) are attached to the motors 4 and 5 respectively so as to detect rotation speed thereof.

A single-shaft gyro sensor 7 is arranged along the direction perpendicular to the rotation axis of the wheels 2 and 3 (the tilt direction of the body 1). Then, the gyro sensor 7 detects tilt angular velocity of the body 1 (herein after, referred to as "body tilt angularvelocity"). In addition, the sensor measuring the body tilt angular velocity is not limited to the gyro sensor. Various measuring instruments measuring tilt angle or tilt angular velocity, such as a gravitational acceleration sensor and strapped-down, may be used.

A motor driver 6 driving the motors 4 and 5, a battery 8 and a control computer 10 as a control means are mounted to the inside (storage part) of the body 1.

The control computer 10 calculates torque command value, which is control command value, based on the output of the gyro sensor 7 and the encoder output of the motors 4 and 5. The torque command value calculated by the control computer 10 is outputted to the motor driver 6, and the motor driver 6 controls the motors 4 and 5 based on this torque command value.

A body of a robot (not shown) or the like is disposed on an upper portion 1a of the body 1.

Next, explanation will be given on control system of the traveling dolly, constructed as mentioned above, according to FIG. 2.

Figure 2:
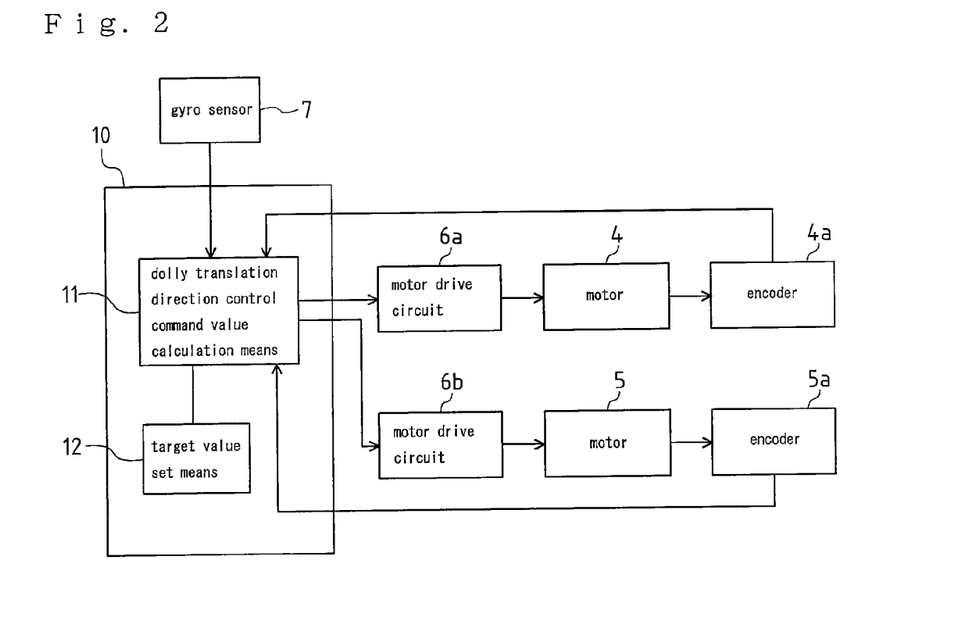
FIG. 2 is a control block diagram of a control system of the traveling dolly.

As shown in FIG. 2, the control computer 10 as the control means controls the traveling dolly. The control computer 10 comprises a CPU, a ROM, a RAM and the like and functions as a dolly translation direction control command value calculation means 11 (hereinafter, simply referred to as "control command value calculation means") calculating a control command value concerning the dolly translation direction (the direction perpendicular to the rotation axis of the wheels 2 and 3) and as a target value set means 12 setting a target body tilt angle discussed later by executing a control program stored in the ROM. In addition, by executing the control program, the control computer 10 also functions as a dolly rotation direction control command value calculation means calculating a control command value concerning the dolly rotation direction (the turning direction of the rotation axis of the wheels 2 and 3).

Figure 1:
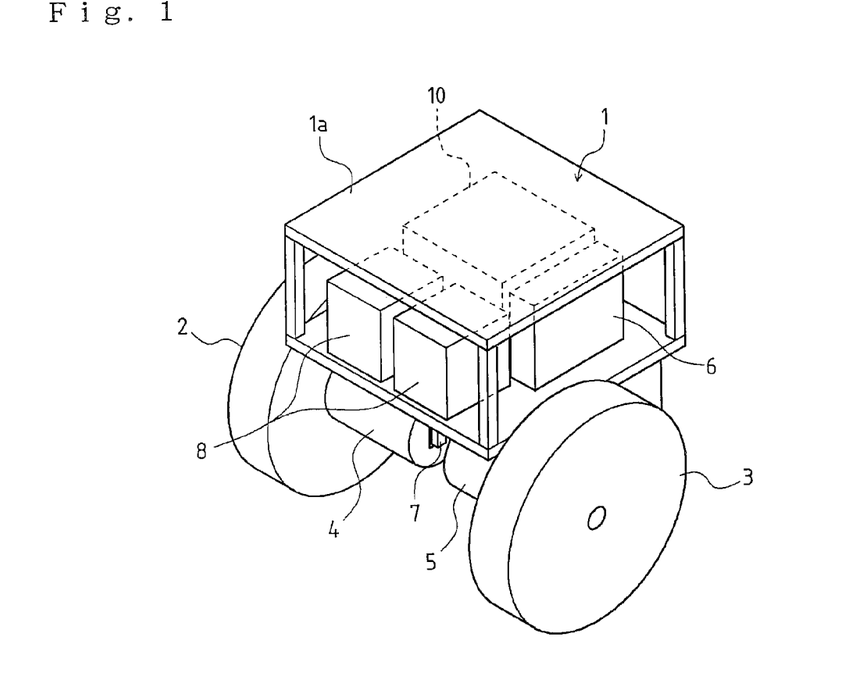
FIG. 1 is a perspective view of schematic construction of a traveling dolly according to the present invention.

Namely, as shown in FIG. 1, with regard to the traveling dolly comprising the two wheels 2 and 3 arranged on the same rotation axis, the control is performed about the dolly translation direction and the dolly rotation direction, and the dolly is rotated (turned) by driving each of the wheels 2 and 3 independently. However, a traveling dolly according to the present invention is not limited thereto, and what is necessary is just that the dolly comprises one wheel or two or more wheels arranged on the same rotation axis. Namely, with regard to a traveling dolly according to the present invention, what is necessary is just that the control about the dolly translation direction is performed.

The gyro sensor 7 is connected to the control computer 10, and the output of the gyro sensor 7 (body tilt angular velocity) is inputted into the control computer 10. Namely, the gyro sensor 7 is an example of a first detection means.

Motor drive circuits 6a and 6b which are parts of the motor driver 6 are connected to the control computer 10. The motor drive circuit 6a is connected to the motor 4 and drives the motor 4 according to a torque command value from the control computer 10. Similarly, the motor drive circuit 6b is connected to the motor 5 and drives the motor 5 according to a torque command value from the control computer 10. The encoders 4a and 5a of the motors 4 and 5 are connected to the control computer 10 so that the output of each of the encoders 4a and 5a (the rotation angle of each of the motors 4 and 5) is inputted into the control computer 10. Namely, the encoders 4a and 5a are an example of a second detection means.

Next, explanation will be given on the control command value calculation means 11. The control command value calculation means 11 calculates a torque command value for the motors 4 and 5 so as to control the dolly translation direction.

Explanation will be given on an example of the design process of the control command value calculation means 11.

Firstly, as shown in FIG. 3(a), the traveling dolly is modeled as a single-wheel inverted pendulum in side view. A lettering 1C designates the centroid of the body 1 (hereinafter, referred to as "body centroid"), and a lettering S designates the rotation axis of the wheel. FIG. 3(b) shows the connection between the motor 4 (or 5) and the wheel 2 (or 3).

Figure 3:
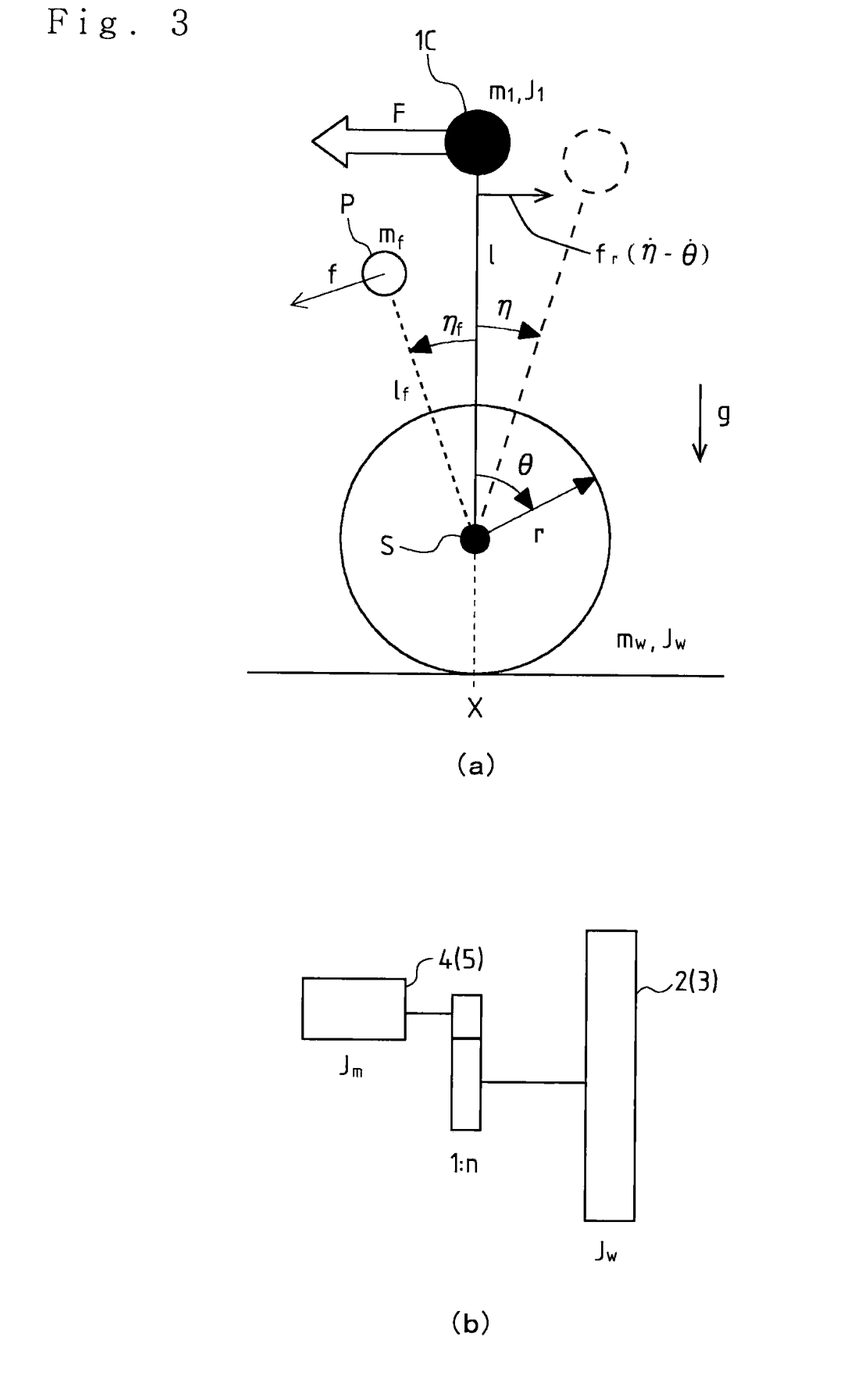
FIG. 3 is a drawing of the traveling dolly modeled according to the translation direction.

In FIG. 3, a lettering $m_1$ designates the mass of the body 1, a lettering $J_1$ designates the moment of inertia around the centroid of the body 1, a lettering $J_w$ designates the moment of inertia around the axis of the wheel, a lettering $J_m$ designates the moment of inertia of the motor rotor, a lettering n designates the gear ratio, a lettering l designates the distance between the rotation axis (axle) S and the body centroid 1C, and a lettering r designates the radius of the wheel.

Each of the parameters $m_1$, $J_1$, $m_w$, $J_w$, $J_m$, n, l and r can be found by calculation or observation. A letter $\eta$ designates the tilt of the body 1 from the vertical direction (a vertical line x passing through the rotation axis S) (hereinafter, referred to as "body tilt angle"), a letter $\theta$ designates the rotation angle of the wheel from the vertical direction (hereinafter, referred to as "wheel angle"), and a letter g designates the gravitational acceleration.

Then, an equation of motion is made concerning the single-wheel inverted pendulum shown in FIG. 3(a). Namely, the equation of motion made supposing that a torque command value u is inputted into the control model is below.

$$(m_1 l^2 + J_1 + n^2 J_m)\ddot{\eta} + (m_1 rl\cos\eta - n^2 J_m)\ddot{\theta} - m_1 gl \sin\eta + f_r(\dot{\eta}-\dot{\theta}) = -nu \quad (1)$$

$$(m_1 rl\cos\eta - n^2 J_m)\ddot{\eta} + \{(m_1+m_w)r^2 + J_w + n^2 J_m\}\ddot{\theta} - m_1 rl\dot{\eta}^2 \sin\eta + f_r(\dot{\theta}-\dot{\eta}) = nu \quad (2)$$

When external force is applied on the body 1 by disturbance such as movement of an operator or loading of a burden, the moment of inertia around the rotation axis S of the wheel is generated by a component F of the external force along the dolly translation direction. When the moment of inertia around the rotation axis S of the body 1 caused by the external force (hereinafter, referred to as "external force moment f") is exchanged for gravity moment of a material point P having mass $m_f$ around the rotation axis S, the external force moment f is formulated by below formula.

$$f = m_f g l_f \sin(\eta_f) \quad (3)$$

Herein, a lettering $l_f$ designates the distance between the rotation axis S and the material point P, and a lettering $\eta_f$ designates the angle of the material point P from the vertical line x centering on the rotation axis S (hereinafter, referred to as "material point tilt angle").

In this control, the external force moment f is estimated, and the body tilt angle $\eta$ at which the gravity moment around the rotation axis S of the body centroid 1C is equal to the external force moment f is set as target body tilt angle $\eta_c$. Based on the target body tilt angle $\eta_c$, the torque command value u which is the control command value is calculated.

Namely, the gravity moment around the rotation axis S of the body centroid 1C is expressed as $m_1 g l_1 \sin(\eta_c)$. Accordingly, the target body tilt angle $\eta_c$ is set according to the formula (3) so as to satisfy below formula.

$$m_f g l_f \sin(\eta_f) = m_1 g l_1 \sin(\eta_c) \quad (4)$$

By calculating the torque command value u based on the target body tilt angle $\eta_c$ found from the estimated external force moment f by the formula (4), the dummy body tilt angle $\eta$ becomes zero (the body centroid 1C is on the x axis) so that the dolly can stops at the initial position even if the external force is applied. Namely, even if large external force is applied on the body 1, the dolly (the position of the wheel) is not moved and the position can be controlled stably at the place, whereby an operator can get on and off easily and goods can be taken on and off easily.

Explanation will be given below on the estimation method of the external force moment f.

Supposing that $\eta$ in the equation of motion shown in formulas (1) and (2) is small, the linearization is performed and the matrix display is performed so as to lead below formula.

$$M \begin{bmatrix} \dot{\eta} \\ \dot{\theta} \\ \ddot{\eta} \\ \ddot{\theta} \\ \dot{f} \end{bmatrix} = A_0 \begin{bmatrix} \eta \\ \theta \\ \dot{\eta} \\ \dot{\theta} \\ f \end{bmatrix} + B_0 u \quad (5)$$

Herein, M in the formula (5) is shown below.

$$M = \begin{bmatrix} 1 & 0 & 0 & 0 & 0 \\ 0 & 1 & 0 & 0 & 0 \\ 0 & 0 & m_1 l^2 + J_1 + n^2 J_m & m_1 rl - n^2 J_m & 0 \\ 0 & 0 & m_1 rl - n^2 J_m & (m_1 + m_w)r^2 + J_w + n^2 J_m & 0 \\ 0 & 0 & 0 & 0 & 1 \end{bmatrix} \quad (6)$$

$A_0$ in the formula (5) is shown below.

$$A_0 = \begin{bmatrix} 0 & 0 & 1 & 0 & 0 \\ 0 & 0 & 0 & 1 & 0 \\ m_1 gl & 0 & -f_r & f_r & 1 \\ 0 & 0 & f_r & -f_r & 0 \\ 0 & 0 & 0 & 0 & 0 \end{bmatrix} \quad (7)$$

$B_0$ in the formula (5) is shown below.

$$B_0 = \begin{bmatrix} 0 \\ 0 \\ -n \\ n \\ 0 \end{bmatrix} \quad (8)$$

Accordingly, below state equation is led from the formulas (5) to (8).

$$M\dot{X} = A_0 X + B_0 u \quad (9)$$

Herein, the state quantity X is shown below.

$$X = \begin{bmatrix} \eta \\ \theta \\ \dot{\eta} \\ \dot{\theta} \\ f \end{bmatrix} \quad (10)$$

By multiplying both sides of the formula (9) by $M^{-1}$ from the left, below formula is led.

$$M^{-1} M \dot{X} = M^{-1} A_0 X + M^{-1} B_0 u \quad (11)$$

Herein, $M^{-1}M = 1$. Supposing that $M^{-1}A_0 = A$ and $M^{-1}B_0 = B$, below formula is led.

$$\dot{X} = AX + Bu \quad (12)$$

Herein, with regard to the state quantity (observed quantity) X observed in the above-mentioned control system, the body tilt angular velocity dη/dt can be measured by the gyro sensor 7, and the wheel rotation angle θ can be measured by the encoders 4a and 5a. Accordingly, by differentiation and integration, the body tilt angle η which is single integral of the body tilt angular velocity dη/dt and the wheel angular velocity dθ/dt which is single differential of the wheel rotation angle θ are calculated.

As the state quantity X, the combination such as the body tilt angle η and the wheel rotation angle θ or the body tilt angle η and the wheel angular velocity dθ/dt can be adopted.

Accordingly, a disturbance observer estimating the external force moment f which is unknown state quantity in the formula (12) is constructed based on below formula.

$$\dot{\overline{X}} = A\overline{X} + Bu + L(y - C\overline{X}) \quad \overline{X}: \text{estimated state quantity (displacement and speed)} \quad (13)$$

Herein, a lettering X designates the state quantity (displacement and speed), a lettering C designates the damper term, and a lettering L designates the observer gain. A lettering y designates the observed quantity and shows the body tilt angle η, the body tilt angular velocity dη/dt, the wheel rotation angle θ and the wheel angular velocity dθ/dt in this case. When a part of the state quantities is unknown, the quantity is calculated by approximate differentiation or integration.

For example, when four state quantities is known which is the body tilt angular velocity dη/dt detected by the gyro sensor 7, the wheel rotation angle θ measured by the encoders 4a and 5a, the body tilt angle η being single integral of the body tilt angular velocity dη/dt, and the wheel angular velocity dθ/dt being single differential of the wheel rotation angle θ, C in the formula (13) is below matrix.

$$C = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 0 \end{bmatrix} \quad (14)$$

Then, the external force moment f is estimated by the formula (13), and the relation of the formula (4) is materialized.

Accordingly, it is necessary to set the target body tilt angle $\eta_c$ in the formula (4) so as to balance with the external force moment f estimated by the disturbance observer estimating unknown state quantity. Essentially, the target body tilt angle is set to 0 so as to stabilize the inverted pendulum shown in FIG. 3(a). However, in this control, the target body tilt angle n c led by the formula (4) is given by below formula so as to offset the external force moment f which is the influence of the external force.

$$\eta_c = \sin^{-1}\left(\frac{f}{m_1 g l_1}\right) \quad (15)$$

By the disturbance observer estimating unknown state quantity as mentioned above, the external force moment f can be found with the existing gyro sensor 7 and the existing encoders 4a and 5a without providing a sensor or the like newly so as to detect the state quantity.

Next, explanation will be given on the process performed by the control computer 10 constructed as mentioned above according to a flow chart shown in FIG. 4.

Figure 4:
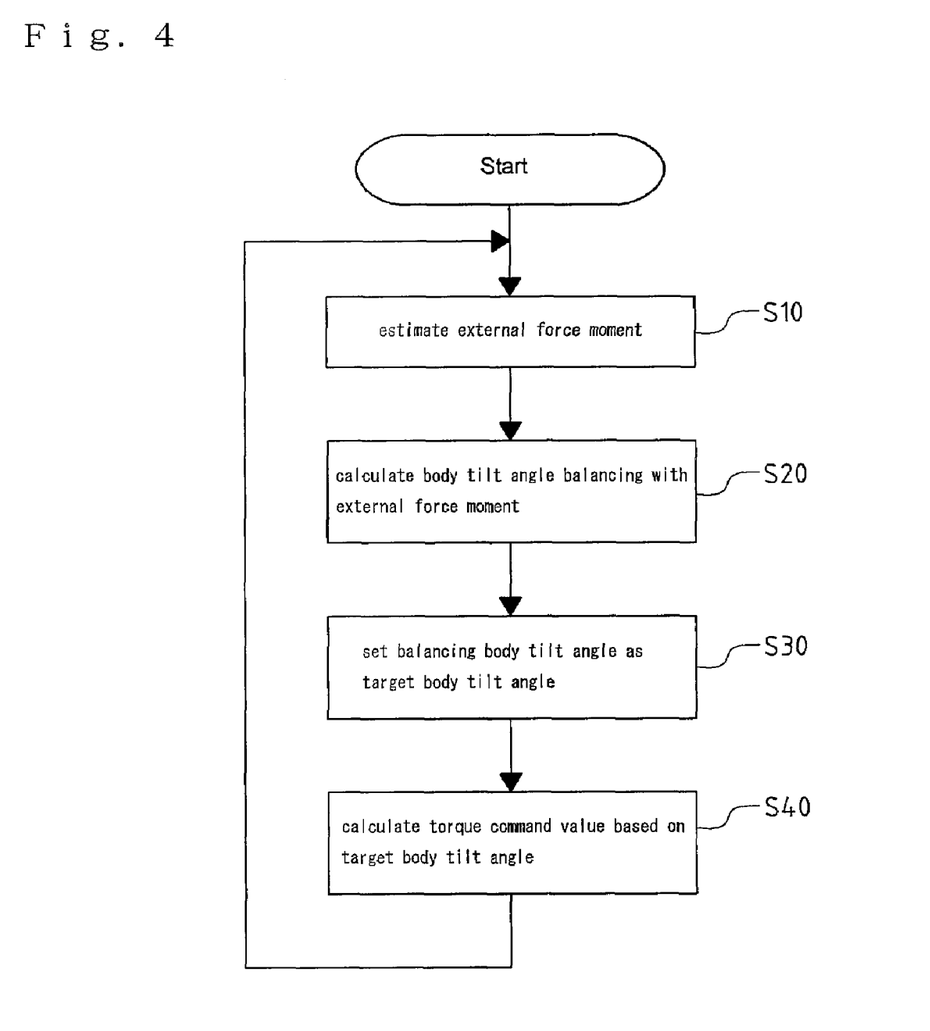
FIG. 4 is a flow chart of process steps performed by a control computer.

As shown in FIG. 4, the control computer 10 firstly loads the body tilt angular velocity dη/dt detected by the gyro sensor 7 and the values from the encoders 4a and 5a of the motors 4 and 5 (the wheel rotation angle θ of the wheels 2 and 3) as the state quantity X, and then estimates the external force moment f from these values and differentials and integrals thereof with the formula (13) (step S10).

Next, the body tilt angle η at which the gravity moment of the body centroid 1C balances with the external force moment f estimated in the step S10 is calculated by the formula (15) (step S20).

The body tilt angle η calculated in the step S20 is set into the target value set means 12 as the target body tilt angle $\eta_c$ (step S30).

Then, based on the target body tilt angle $\eta_c$ set at the step S30, the control command value calculation means 11 calculates the torque command value u for the motor drive circuits 6a and 6b of the motors 4 and 5 (step S40). The calculated torque command value u is inputted into the motor drive circuits 6a and 6b so as to control the motors 4 and 5. When the step S40 is finished, the process is returned to the step S10 and is started at the next control timing. Namely, the feedback control is performed so that the target body tilt angle $\eta_c$ is calculated on occasion to balance with the external force moment f generated by the disturbance applied on the body 1.

In addition, the above-mentioned process of the steps S10 to S40 is performed at fixed intervals (for example, 10 ms).

Upon this, the external force applied on the body 1 may be estimated indirectly from the body tilt angle η instead of finding the external force moment f directly as mentioned above.

When the disturbance is applied on the body 1, the body 1 is tilted and the body tilt angle η becomes a value other than zero. Namely, in the case that the body 1 is at a standstill stably (the body tilt angle η is zero) and the control computer 10 does not transmit the torque command value concerning the dolly translation direction and the dolly rotation direction, that is, the case that the body 1 does not move along longitudinal or turning direction and is at a standstill, for example the case that any operator does not ride on the body 1, the body tilt angle η being a value other than zero means that the external force is applied on the body 1. Then, when the body tilt angle η becomes a value other than zero by the external force applied on the body 1, the body tilt angle η is adjusted so as to offset the body tilt angle η (to make the body tilt angle η zero).

Namely, in the state that the control computer 10 does not transmit the torque command value for moving the body 1 (the torque command value concerning the dolly translation direction and the dolly rotation direction) to the motor driver 6 (the state that the body 1 is at a standstill), when the body tilt angle η calculated from the detection value of the gyro sensor 7 becomes a value other than zero, the target body tilt angle of the body 1 (the target body tilt angle $\eta_c$) is increased and decreased so as to make the body tilt angle η zero, and the torque command value u is calculated based on this target body tilt angle $\eta_c$.

Concretely, when the disturbance is applied on the body 1 and the body tilt angle η becomes a value other than zero, Δη is integrated to the target body tilt angle $\eta_c$ until the body tilt angle η becomes zero. Herein, as shown in FIG. 3 (a), the direction of a component F of the disturbance applied on the body 1 along the dolly translation direction is considered to be positive. In this case, the position of the body centroid 1C is moved forward by the disturbance, whereby the body tilt angle η is increased positively. Supposing that the generated body tilt angle η is the material point tilt angle $\eta_f$ similarly to the above, Δη is integrated to the target body tilt angle $\eta_c$ so as to offset the influence of the disturbance. Namely, when the body tilt angle η generated by the disturbance is the material point tilt angle $η_f$, Δη integrated to the target body tilt angle $η_c$ is negative.

By integrating Δη to the target body tilt angle $η_c$ until the body tilt angle η becomes zero, the formula (4) is materialized when the body tilt angular velocity dη/dt becomes zero. Namely, the external force moment f generated by the disturbance applied on the body 1 balances with the gravity moment around the rotation axis S of the body centroid 1C. At this time, the integration of Δη is stopped.

Accordingly, by estimating the external force applied on the body 1 indirectly from the body tilt angle η and increasing and decreasing the target body tilt angle $η_c$ so as to offset the external force, the moving distance from the time that the external force applied on the body 1 by the disturbance to the time that the traveling dolly is stopped stably is shorten. Accordingly, for example in the two-wheel state of the traveling dolly (the state that the body 1 is supported only by the wheels 2 and 3), goods can be taken on and off easily and an operator can get on and off easily.

In addition, instead of the body tilt angle η, the body tilt angular velocity dη/dt may be used so as to estimate the external force applied on the body 1 indirectly. In this case, the control computer 10 does not transmit the torque command value for moving the body 1 to the motor driver 6. When the body tilt angular velocity dη/dt detected by the gyro sensor 7 is not zero, the target body tilt angle $η_c$ is increased and decreased until the body tilt angular velocity dη/dt becomes zero, and the torque command value u is calculated based on this target body tilt angle $η_c$.

When the external force applied on the body 1 is estimated indirectly from the body tilt angle η or the body tilt angular velocity dη/dt so as to increase and decrease the target body tilt angle $η_c$, it is preferable to increase and decrease Δη, which is the increase and decrease value of the target body tilt angle $η_c$, based on the absolute value of the body tilt angle η or the body tilt angular velocity dη/dt.

Namely, when the external force applied on the body 1 is large and the absolute value of the body tilt angle η or the body tilt angular velocity dη/dt generated by the external force is large, the absolute value of Δη is increased. Then, following the decrease of the absolute value of the body tilt angle η by the target body tilt angle $η_c$ offsetting the influence of the disturbance, the absolute value of Δη is decreased.

Accordingly, by increasing and decreasing Δη integrated to the target body tilt angle $η_c$ according to the absolute value of the body tilt angle η or the body tilt angular velocity dη/dt, the slight vibration can be prevented in the region that the absolute value of the body tilt angle η or the body tilt angular velocity dη/dt is small, that is, in the vicinity of the balanced position of the body 1.

Therefore, even if the external force applied on the body 1 is large, the body 1 can be stopped immediately. Furthermore, the vibration of the body 1 caused by the sequential fluctuation of the target body tilt angle $η_c$ can be reduced or prevented.

Δη integrated to the target body tilt angle $η_c$ can be learned sequentially. Namely, for example, the magnitude of the body tilt angle $η_c$ and the fluctuation of the body tilt angular velocity dη/dt in the case that the external force is applied on the body 1 are regarded as the performance indexes, and Δη is learned so as to decrease the magnitude of the body tilt angle η and the fluctuation of the body tilt angular velocity dη/dt.

For example, for decreasing the magnitude of the body tilt angle η in the case that the external force is applied on the body 1, what is necessary is just to increase Δη integrated to the target body tilt angle $η_c$. As large as Δη becomes, as soon as the target body tilt angle $η_c$ reaches the state balancing with the external force (the state that the formula (4) is materialized) so that the gravity moment of the body centroid 1C balances with the external force moment f. However, if Δη is increased, the slight vibration in the vicinity of the balanced position of the body 1 becomes large in the balancing process.

The body tilt angular velocity dη/dt is decreased following the integration of Δη to the target body tilt angle $η_c$ from the time that the external force is applied on the body 1. Accordingly, by decreasing Δη following this decrease of the body tilt angular velocity dη/dt, the fluctuation of the body tilt angular velocity dη/dt becomes small.

Accordingly, the correspondence between Δη integrated to the target body tilt angle $η_c$ and the body tilt angular velocity dη/dt in the case that the external force is applied on the body 1 is memorized sequentially in the RAM or the like of the control computer 10. Therefore, Δη which makes both the body tilt angle η and the body tilt angular velocity dη/dt small is learned finally so as to prevent the slight vibration in the vicinity of the balanced position of the body 1 efficiently.

The external force applied on the body 1 can also be estimated indirectly from the wheel angular velocity dθ/dt. In addition, the explanation overlapping the case estimating the external force applied on the body 1 from the body tilt angle η will be omitted below.

When the external force is applied on the body 1, the body 1 is tilted. The wheels 2 and 3 are moved to the direction offsetting the tilt of the body 1 (the direction of the external force) so as to stabilize the body 1, whereby the wheel angular velocity dθ/dt becomes a value other than zero. Namely, in the case that the body 1 stops stably (the wheel angular velocity dθ/dt is zero) and the control computer 10 does not transmit the torque command value concerning the dolly translation direction and the dolly rotation direction, such as the case that the time that an operator does not operates the dolly, the wheel angular velocity dθ/dt being a value other than zero means that the external force is applied on the body 1. Then, when the wheel angular velocity dθ/dt becomes a value other than zero by the external force applied on the body 1, the wheel angular velocity dθ/dt is adjusted so as to offset the wheel angular velocity dθ/dt (to make the wheel angular velocity dθ/dt zero).

Namely, in the state that the control computer 10 does not transmit the torque command value for moving the body 1 to the motor driver 6, when the wheel angular velocity dθ/dt calculated from the wheel rotation angle θ measured by the encoders 4a and 5a becomes a value other than zero, the body tilt angle $η_c$ is increased and decreased so as to make the wheel angular velocity dθ/dt zero, and the torque command value u is calculated based on this target body tilt angle $η_c$.

Concretely, when the disturbance is applied on the body 1 and the wheel angular velocity dθ/dt becomes a value other than zero, Δη is integrated to the target body tilt angle $η_c$ until the wheel angular velocity dθ/dt becomes zero. Herein, as shown in FIG. 3 (a), the direction of a component F of the disturbance applied on the body 1 along the dolly translation direction is considered to be positive. In this case, the position of the body centroid 1C is moved forward by the disturbance, whereby the body tilt angle η is increased positively. Supposing that the generated body tilt angle η is the material point tilt angle $η_f$ similarly to the above, Δη is integrated to the target body tilt angle $η_c$ so as to offset the influence of the disturbance. Namely, when the body tilt angle η generated by the disturbance is the material point tilt angle $η_f$, Δη integrated to the target body tilt angle $η_c$ is negative.

By integrating $\Delta\eta$ to the target body tilt angle $\eta_c$ until the body tilt angle $\eta$ becomes zero, the formula (4) is materialized when the body tilt angular velocity $d\eta/dt$ becomes zero. Namely, the external force moment f generated by the disturbance applied on the body 1 balances with the gravity moment around the rotation axis S of the body centroid 1C. At this time, the integration of $\Delta\eta$ is stopped.

Accordingly, by estimating the external force applied on the body 1 indirectly from the wheel angular velocity $d\theta/dt$ and increasing and decreasing the target body tilt angle $\eta_c$ so as to offset the external force, the same effect as was previously mentioned can be obtained.

When the external force applied on the body 1 is estimated indirectly from the wheel angular velocity $d\theta/dt$ so as to increase and decrease the target body tilt angle $\eta_c$, it is also preferable to increase and decrease $\Delta\eta$, which is the increase and decrease value of the target body tilt angle $\eta_c$, based on the absolute value of the wheel angular velocity $d\theta/dt$.

Namely, when the external force applied on the body 1 is large and the absolute value of the wheel angular velocity $d\theta/dt$ generated by the external force is large, the absolute value of $\Delta\eta$ is increased. Then, following the decrease of the absolute value of the body tilt angle $\eta$ by the target body tilt angle $\eta_c$ offsetting the influence of the disturbance, the absolute value of $\Delta\eta$ is decreased.

Accordingly, by increasing and decreasing $\Delta\eta$ integrated to the target body tilt angle $\eta_c$ according to the absolute value of the wheel angular velocity $d\theta/dt$, the slight vibration can be prevented in the region that the absolute value of the wheel angular velocity $d\theta/dt$ is small, that is, in the vicinity of the balanced position of the body 1.

Therefore, even if the external force applied on the body 1 is large, the body 1 can be stopped immediately. Furthermore, the vibration of the body 1 caused by the sequential fluctuation of the target body tilt angle $\eta_c$ can be reduced or prevented.

In this case, $\Delta\eta$ integrated to the target body tilt angle $\eta_c$ can also be learned sequentially. Namely, for example, the magnitude of the wheel rotation angle $\theta$ (the moving direction of the wheel) and the fluctuation of the wheel angular velocity $d\theta/dt$ in the case that the external force is applied on the body 1 are regarded as the performance indexes, and $\Delta\eta$ is learned so as to decrease the magnitude of the wheel rotation angle $\theta$ and the fluctuation of the wheel angular velocity $d\theta/dt$.

For example, for decreasing the magnitude of the moving direction of the wheel in the case that the external force is applied on the body 1, what is necessary is just to increase $\Delta\eta$ integrated to the target body tilt angle $\eta_c$. As large as $\Delta\eta$ becomes, as soon as the target body tilt angle n c reaches the state balancing with the external force (the state that the formula (4) is materialized) so that the gravity moment of the body centroid 1C balances with the external force moment f. However, if $\Delta\eta$ is increased, the slight vibration in the vicinity of the balanced position of the body 1 becomes large in the balancing process.

The wheel angular velocity $d\theta/dt$ is decreased following the integration of $\Delta\eta$ n to the target body tilt angle $\eta_c$ from the time that the external force is applied on the body 1. Accordingly, by decreasing $\Delta\eta$ following this decrease of the wheel angular velocity $d\theta/dt$, the fluctuation of the wheel angular velocity $d\theta/dt$ becomes small.

Accordingly, the correspondence between $\Delta\eta$ integrated to the target body tilt angle $\eta_c$ and the wheel angular velocity $d\theta/dt$ in the case that the external force is applied on the body 1 is memorized sequentially in the RAM or the like of the control computer 10. Therefore, $\Delta\eta$ which makes both the moving direction of the wheel and the wheel angular velocity $d\theta/dt$ small finally is learned so as to prevent the slight vibration in the vicinity of the balanced position of the body 1 efficiently.

Possibility Of The Industrial Utilization

The present invention provides control method of a traveling dolly and the traveling dolly which makes the movement of the dolly (a position of a wheel) minimum and enables stable position control in the case that large external force is applied on the dolly so that goods can be taken on and off easily and an operator can get on and off easily. accordingly, the present invention is useful industrially.

The invention claimed is:

1. Control method of a traveling dolly having a wheel driven by a drive means, a body supported by the wheel, and a control means commanding a control command value to the drive means, a centroid of the body positioning above a rotation axis of the wheel, wherein:
   the control means estimates an external force moment, which is a moment of inertia around the rotation axis generated by external forces applied on the body;
   based on the estimated external force moment, a tilt angle of the body, which makes a gravity moment around the rotation axis of the body centroid balance with the external force moment, is set as a target body tilt angle;
   based on the target body tilt angle, the control command value is calculated; and
   the target tilt angle is increased or decreased corresponding to the absolute value of the tilt angle or a tilt angular velocity of the body detected by a first detection means.

2. Control method of a traveling dolly having a wheel driven by a drive means, a body supported by the wheel, and a control means commanding a control command value to the drive means, a centroid of the body positioning above a rotation axis of the wheel, wherein:
   the traveling dolly comprises a first detection means detecting at least one of a tilt angle and a tilt angular velocity of the body and a second detection means detecting at least one of a rotation angle and an angular velocity of the wheel;
   in the case that the control means does not transmit the control command value for moving the body and the tilt angle or the tilt angular velocity of the body detected by the first detection means becomes a value other than zero, a target tilt angle of the body is increased or decreased until the tilt angle or the tilt angle velocity becomes zero, and the control command value is calculated based on the target tilt angle; and
   the target tilt angle is increased or decreased corresponding to the absolute value of the tilt angle or the tilt angular velocity of the body detected by the first detection means.

3. The control method of the traveling dolly as set forth in claim 2, wherein the increase and decrease value of the target tilt angle is learned so as to decrease a fluctuation of the tilt angle and the tilt angular velocity based on at least one of the tilt angle and the tilt angular velocity as performance indexes.

4. Control method of a traveling dolly having a wheel driven by a drive means, a body supported by the wheel, and a control means commanding a control command value to the drive means, a centroid of the body positioning above a rotation axis of the wheel, wherein:
   the traveling dolly comprises a first detection means detecting at least one of a tilt angle and a tilt angular velocity of the body and a second detection means detecting at least one of a rotation angle and an angular velocity of the wheel;

in the case that the control means does not transmit the control command value for moving the body and the angular velocity of the wheel detected by the second detection means becomes a value other than zero, a target tilt angle of the body is increased or decreased until the angular velocity becomes zero, and the control command value is calculated based on the target tilt angle, wherein the target tilt angle is increased or decreased corresponding to the absolute value of the angular velocity of the wheel detected by the second detection means.

5. The control method of the traveling dolly as set forth in claim 4, wherein the increase and decrease value of the target tilt angle is learned so as to decrease a fluctuation of the rotation angle and the angular velocity of the wheel based on at least one of the rotation angle and the angular velocity of the wheel as performances indexes.

6. A traveling dolly having a wheel driven by a drive means, a body supported by the wheel, and a control means commanding a control command value to the drive means, a centroid of the body positioning above a rotation axis of the wheel, wherein:
the control means estimates an external force moment, which is a moment of inertia around the rotation axis generated by an external force applied on the body;
based on the estimated external force moment, a tilt angle of the body, which makes a gravity moment around the rotation axis of the body centroid balance with the external force moment, is set as a target body tilt angle;
based on the target body tilt angle, the centroid command value is calculated; and
the target body tilt angle is increased or decreased corresponding to the absolute value of the tilt angle or a tilt angular velocity of the body detected by a first detection means.

7. A traveling dolly having a wheel driven by a drive means, a body supported by the wheel, and a control means commanding a control command value to the drive means, a centroid of the body positioning above a rotation axis of the wheel, wherein:
the traveling dolly comprises a first detection means detecting at least one of a tilt angle and a tilt angular velocity of the body and a second detection means detecting at least one of a rotation angle and an angular velocity of the wheel;
in the case that the control means does not transmit the control command value for moving the body and the tilt angle or the tilt angular velocity of the body detected by the first detection means becomes a value other than zero, a target tilt angle of the body is increased or decreased until the tilt angle or the tilt angular velocity becomes zero, and the control command value is calculated based on the target tilt angle; and
the target tilt angle is increased or decreased corresponding to the absolute value of the tilt angle or the tilt angular velocity of the body detected by the first detection means.

8. A traveling dolly having a wheel driven by a drive means, a body supported by the wheel, and a control means commanding a control command value to the drive means, a centroid of the body positioning above a rotation axis of the wheel; wherein:
the traveling dolly comprises a first detection means detecting at least one of a tilt angle and a tilt angular velocity of the body and a second detection means detecting at least one of a rotation angle and an angular velocity of the wheel;
in the case that the control means does not transmit the control command value for moving the body and the angular velocity of the wheel detected by the second detection means becomes a value other than zero, a target tilt angle of the body is increased or decreased until the angular velocity becomes zero, and the control command value is calculated based on the target tilt angle; and
the target tilt angle is increased or decreased corresponding to the absolute value of the tilt angle or the tilt angular velocity of the body detected by the first detection means.

* * * * *